March 17, 1970     L. V. HODGE     3,500,767
MACHINES FOR THE MANUFACTURE OF PASTRIES
Filed Feb. 15, 1968
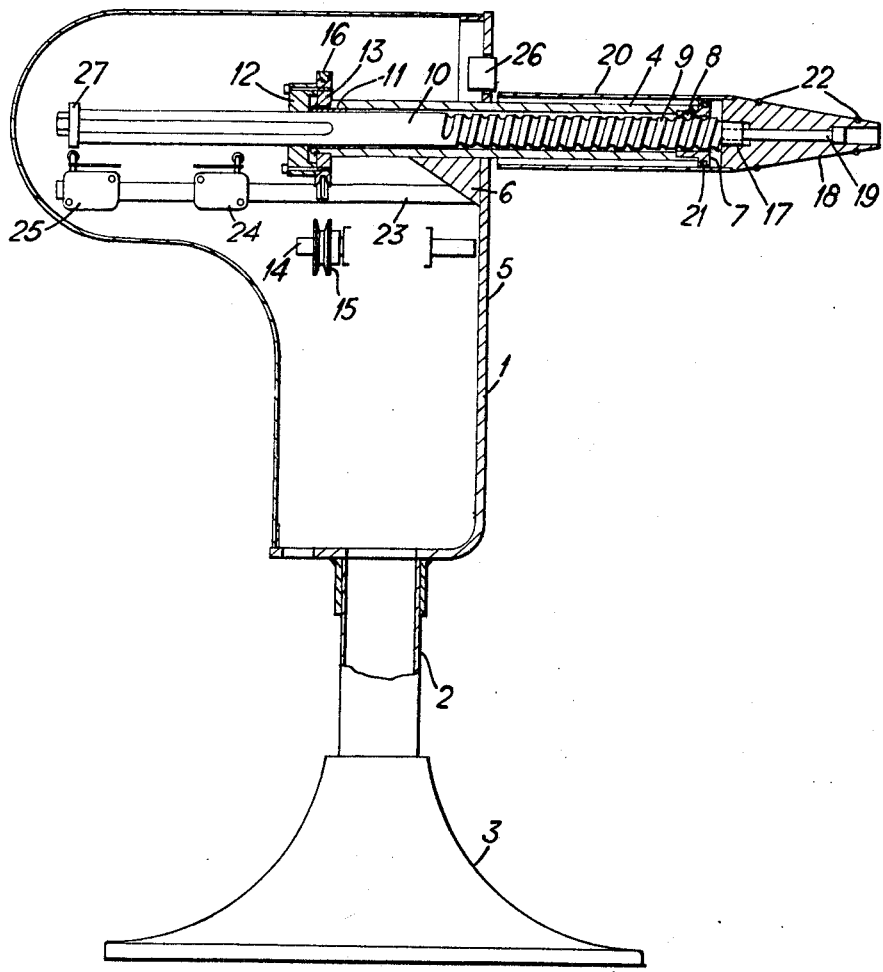
LESLIE VICTOR HODGE,
*Inventor*
By Wenderoth, Lind
& Ponack, *Attorneys*

United States Patent Office 3,500,767
Patented Mar. 17, 1970

3,500,767
MACHINES FOR THE MANUFACTURE OF PASTRIES
Leslie Victor Hodge, 101 Blackamoor Lane,
Maindenhead, Berkshire, England
Filed Feb. 15, 1968, Ser. No. 705,789
Claims priority, application Great Britain, Aug. 29, 1967,
39,386/67
Int. Cl. A21c *11/00*
U.S. Cl. 107—8                                          7 Claims

ABSTRACT OF THE DISCLOSURE

The invention relates to machines for winding strips of uncooked pastry into conical shells which are subsequently baked and filled with cream or other fillings. The machine comprises a shaft carrying a chuck at one end to mount a pastry former, the shaft being mounted so that it rotates and moves axially simultaneously when driven. In the preferred embodiment the shaft is rotatably driven by a motor and has a screw thread engaging a mating member fixed to the machine to produce the axial movement during rotation. Limit switches may be provided to stop movement at each of the axial travel of the shaft.

---

This invention relates to machines for use in the manufacture of pastries and particularly to a machine for forming a case of raw pastry.

As is well known, pastries are produced by forming a casing of uncooked or raw pastry mix to a desired shape, baking the casing so formed to render the pastry edible, and completing the pastry with a filling of cream, jam or other edible substance.

One popular form of casing is in the shape of a cone open at its large end and filled with cream. Heretofore, the cone has been produced by hand using a strip of raw pastry mixture which is wound spirally upon the outside surface of a conical metal pastry former. Several attempts have been made to mechanise the process of forming the cone but at present no successful machine is available to replace the universally employed method of winding the pastry on the coned former by hand.

The object of the present invention is the production of a machine which will successfully solve this problem.

In accordance with the invention a machine for use in making pastries by winding a length of uncooked pastry mixture into a conical spiral comprises a fixed support mounting a slidable and rotatable shaft, reversible drive means to produce rotary motion of the shaft, inter-engaging screw thread means on the support and the shaft to cause the shaft to move axially simultaneously with the rotary motion produced by the drive means, and means for releasably attaching a pastry moulding cone on one end of the shaft.

Also in accordance with the invention a machine for use in making pastries by winding a length of uncooked pastry mixture into a conical spiral comprises a housing, a tubular support extending outwardly from the housing, a shaft rotatably and slidably mounted in the support, the shaft being screw-threaded for engagement with a corresponding thread engaging element fixed within the support so that rotation of the shaft produces axial movement thereof, a chuck piece at one end of the shaft to hold a pastry moulding cone, a reversible drive motor within the housing, and drive connections between the motor and the shaft to permit axial movement of the shaft during rotation thereof by the motor.

A preferred embodiment of the invention will now be described by way of illustration with reference to the accompanying drawing which shows a part of the sectioned elevation of a machine in accordance with the invention.

The machine shown in the drawing comprises a housing 1 mounted on a pillar 2 which is adjustably clamped to a base 3 in such a manner that the height of the housing above a work bench to which the base 3 is attached can be varied as required.

A tubular support 4 extends outwardly from a front wall 5 of the housing and is rigidly attached to the housing by welding or other suitable fixing means. The attachment includes a reinforcing fillet 6 which is welded to the front wall and the support. The outer end of the support carries a bush 7 which houses at least one bearing ball 8 and maintains it against axial movement to serve as a fixed element engaging a screw-threaded portion 9 of a shaft 10 which is rotatably and slidably mounted in the support by the bush 7 and a second bush 11 mounted on the inner end of the support. It will be observed that the engagement of the bearing ball 8 with the threaded portion 9 causes axial movement of the shaft when the shaft is rotated.

A portion of the shaft extending within the casing to the inner end of the support is splined, the splines engaging corresponding recesses in a drive ring 12 which is bolted to a pulley 13 rotatably mounted on the outer surface of the inner end of the support. An electric motor within the casing (not shown) is geared to a drive shaft 14 carrying a pulley 15 connected to the pulley 13 by a belt drive 16. The electric motor is reversible.

The outer end of the shaft terminates in a nose piece 17 which supports the rear and larger end of a cone-shaped chuck piece which is secured to the end of the shaft by a screw 19. The rear end of the chuck piece carries a tubular cover 20, the inside surface of which engages an O-ring seal 21 mounted on the periphery of the bush 7 to exclude the entry of particles of pastry mixture to the screwed portion of the shaft. The exterior surface of the chuck piece carries two spaced-apart rubber rings 22 to provide a resilient gripping means for a coned pastry former.

A bar 23 within the casing extending parallel with the shaft supports spaced-apart front and rear micro-switches 24, 25 which are wired in circuit with the motor and a start switch 26 mounted in the front wall of the casing. The limit switches are engageable by a cam piece 27 attached to the rear end of the shaft.

In operation a coned former for a pastry is pushed on to the end of the chuck piece 18 and is firmly but resiliently held thereon by engagement with the rings 22, and a length of pastry to be wound on the former is held by an operator in front of the point of the cone. At this stage the shaft is in the position shown in the drawing, that is to say withdrawn within the casing so that the cam piece 27 engages the rear limit switch 25. Switch 26 is then pressed by the operator, thus energising the motor which rotates the shaft by means of the belt drive and pulleys 13, 15, and 16 and the drive ring 12 in such a direction that the shaft moves axially outwardly during its rotation. The axial and rotary movement thus produced causes the length of pastry held by the operator to be evenly wound up into a spiral on the surface of the coned pastry former. When the shaft has moved outwardly to the extent that the surface of the former is entirely covered with a pastry winding, the cam piece 27 engages the limit switch 24 thus breaking the electrical connection to the motor and stopping further rotation. The former with its pastry winding is then removed from the chuck piece. The shaft is then returned to its initial position for repetition of the winding process by once more pressing the switch 26, the electrical connections being such that re-energisation of the motor following engagement of the cam piece 27 with the switch 24 causes the direction of rotation of the motor and, in consequence, that of the shaft to be reversed and produce axial movement of the shaft in the reverse direction. The reverse movement continues until the cam piece once more re-engages the switch 25 which stops the motor and again reverses the electrical connections so that outward movement of the shaft will take place when the switch 26 is once more pressed to wind the pastry on a further former mounted on the chuck piece 18.

What I claim is:

1. A machine for use in making pastries by winding a length of uncooked pastry mixture into a conical spiral comprising a fixed support, an axially slidable and rotatable shaft mounted on said support, reversible drive means to produce rotary motion of said shaft, inter-engaging screw thread means on said support and said shaft to cause the shaft to move axially simultaneously with the rotary motion produced by said drive means, and means for releasably attaching a pastry moulding cone on one end of said shaft.

2. A machine for use in making pastries by winding a length of uncooked pastry mixture into a conical spiral comprising a housing, a tubular support extending outwardly from said housing having a thread engaging element, a shaft rotatably and slidably mounted in said support, said shaft being screw-threaded for engagement with said thread engaging element so that rotation of said shaft produces axial movement thereof, a chuck piece at one end of said shaft to hold a pastry moulding cone, a reversible drive motor within said housing, and drive connections between said motor and said shaft to permit axial movement of said shaft during rotation thereof by said motor.

3. A machine according to claim 2, wherein said thread engaging element is a bush supporting a bearing ball engaging the shaft thread, said bush preventing movement of said ball parallel to the shaft axis.

4. A machine according to claim 2, wherein longitudinal splines are provided on said shaft and said drive connections comprise a rotary drive ring on said support having recesses to engage said longitudinal splines.

5. A machine according to claim 4 wherein a pulley of a belt and pulley drive from said motor is provided and said drive ring is attached to said pulley.

6. A machine according to claim 2, wherein two micro-switches are spaced apart for engagement by a cam piece mounted on said shaft, each switch being positioned for actuation at one end of the travel of said shaft to stop said motor and to reverse the connections thereto so that the direction of movement of said shaft is reversed when the motor is restarted.

7. A machine according to claim 2, wherein said chuck piece is of conical shape and carries resilient gripping means on its outer surface to engage the inside of a pastry cone.

References Cited

UNITED STATES PATENTS 754,549   3/1904   Dietz _____ 107—8

EDWARD L. ROBERTS, Primary Examiner

U.S. Cl. X.R.

107—1